United States Patent
Shinoda et al.

(10) Patent No.: US 7,918,729 B2
(45) Date of Patent: Apr. 5, 2011

(54) PROGRAM PRODUCT, IMAGE GENERATION SYSTEM, AND IMAGE GENERATION METHOD

(75) Inventors: Tetsuya Shinoda, Yokohama (JP); Takeshi Ono, Kawasaki (JP); Hideo Yoshizawa, Yokohama (JP)

(73) Assignee: Namco Bandai Games Inc., Tokyo (JP)

( * ) Notice: Subject to any disclaimer, the term of this patent is extended or adjusted under 35 U.S.C. 154(b) by 1132 days.

(21) Appl. No.: 11/237,849

(22) Filed: Sep. 29, 2005

(65) Prior Publication Data
US 2006/0073862 A1    Apr. 6, 2006

(30) Foreign Application Priority Data
Sep. 30, 2004  (JP) .................................. 2004-287828

(51) Int. Cl.
*A63F 13/00*    (2006.01)
(52) U.S. Cl. ............................................ 463/31; 463/33
(58) Field of Classification Search .................... 463/30, 463/31, 32, 33, 34
See application file for complete search history.

(56) References Cited

U.S. PATENT DOCUMENTS

| | | | | |
|---|---|---|---|---|
| 4,542,903 | A * | 9/1985 | Yokoi et al. | 463/31 |
| 4,738,451 | A * | 4/1988 | Logg | 463/2 |
| 6,238,291 | B1 * | 5/2001 | Fujimoto et al. | 463/44 |
| 6,319,119 | B1 * | 11/2001 | Konoe et al. | 463/2 |
| 6,478,679 | B1 * | 11/2002 | Himoto et al. | 463/36 |
| 7,371,163 | B1 * | 5/2008 | Best | 463/1 |
| 2005/0130738 | A1 * | 6/2005 | Miyamoto et al. | 463/30 |
| 2005/0187015 | A1 * | 8/2005 | Suzuki et al. | 463/32 |
| 2005/0187023 | A1 * | 8/2005 | Miyamoto et al. | 463/43 |

FOREIGN PATENT DOCUMENTS

| | | |
|---|---|---|
| JP | A 2000-245960 | 9/2000 |
| JP | A-2002-282541 | 10/2002 |
| JP | A-2003-053038 | 2/2003 |

OTHER PUBLICATIONS

Article from "Donkey Kong II," Denshi Gemu Dai-Sakusen [Electronic Game Great Operation], Saishin-Karaban, Kodomo Poketto Hyakka, 1st ed. Jitsugyo no Nihon Sha, Ltd., Nov. 24, 1983, p. 188-189 (with partial English-language translation).
Office Action issued on Sep. 24, 2009 for Japanese Patent Application No. 2004-287828 (with English translation).

* cited by examiner

*Primary Examiner* — James S McClellan
(74) *Attorney, Agent, or Firm* — Oliff & Berridge, PLC

(57) ABSTRACT

An image generation system includes a display control section which controls display of images displayed in a touch panel display and a display, a movement control section which controls movement of a moving object, a game calculation section which performs processing of calculating a game parameter which changes as a result of game play using the moving object, and a movement permission condition determination section which determines whether or not a condition for permitting movement of the moving object from a game field G1 to a game field G2 has been satisfied based on the game parameter which changes as a result of game play in the game field G1. The movement control section performs control of moving the moving object from the game field G1 to the game field G2 when the movement permission condition has been satisfied.

12 Claims, 16 Drawing Sheets

PROGRAM PRODUCT, IMAGE GENERATION SYSTEM, AND IMAGE GENERATION METHOD

Japanese Patent Application No. 2004-287828, filed on Sep. 30, 2004, is hereby incorporated by reference in its entirety.

BACKGROUND OF THE INVENTION

The present invention relates to a program product, an image generation system, and an image generation method.

In an ordinary image generation system which generates a game image, a player enjoys a game by moving a player's character (moving object in a broad sense) displayed in a display or causing the player's character to attack an enemy character by operating a direction key and buttons provided on a game controller. An image generation system provided with a touch panel display has also been known, in which a player performs a game operation by using the touch panel display (JP-A-2000-245960).

However, a related-art image generation system is generally provided with only one display, and an image generation system provided with two or more displays, which allows a player to enjoy a game by using the two or more displays, is limited.

SUMMARY

A program product for generating an image according to a first aspect of the invention causes a computer to function as:

a display control section which controls display of images displayed in first and second displays;

a movement control section which controls movement of a moving object;

a game calculation section which performs processing of calculating a game parameter which changes as a result of game play using the moving object; and a movement permission condition determination section which determines, based on the game parameter which changes as a result of game play in a first game field, whether or not a movement permission condition for permitting movement of the moving object from the first game field to a second game field has been satisfied, the first game field being displayed in the first display and the second game field being displayed in the second display, wherein the movement control section performs control of moving the moving object from the first game field to the second game field when the movement permission condition has been satisfied.

A program product for generating an image according to a second aspect of the invention causes a computer to function as:

a display control section which controls display of game images displayed in first and second displays;

a movement control section which controls movement of a moving object; and a passage condition determination section which determines whether or not a passage condition for the moving object to pass through a path from a first game field to a second game field has been satisfied, the first game field being displayed in the first display and the second game field being displayed in the second display, wherein the movement control section performs control of moving the moving object from the first game field to the second game field when the passage condition has been satisfied.

An image generation system which generates an image according to a third aspect of the invention comprises:

a display control section which controls display of images displayed in first and second displays;

a movement control section which controls movement of a moving object;

a game calculation section which performs processing of calculating a game parameter which changes as a result of game play using the moving object; and a movement permission condition determination section which determines, based on the game parameter which changes as a result of game play in a first game field, whether or not a movement permission condition for permitting movement of the moving object from the first game field to a second game field has been satisfied, the first game field being displayed in the first display and the second game field being displayed in the second display, wherein the movement control section performs control of moving the moving object from the first game field to the second game field when the movement permission condition has been satisfied.

An image generation system which generates an image according to a fourth aspect of the invention comprises:

a display control section which controls display of game images displayed in first and second displays;

a movement control section which controls movement of a moving object; and a passage condition determination section which determines whether or not a passage condition for the moving object to pass through a path from a first game field to a second game field has been satisfied, the first game field being displayed in the first display and the second game field being displayed in the second display, wherein the movement control section performs control of moving the moving object from the first game field to the second game field when the passage condition has been satisfied.

An image generation method for generating an image according to a fifth aspect of the invention comprises:

controlling display of images displayed in first and second displays;

controlling movement of a moving object;

performing processing of calculating a game parameter which changes as a result of game play using the moving object;

determining, based on the game parameter which changes as a result of game play in a first game field, whether or not a movement permission condition for permitting movement of the moving object from the first game field to a second game field has been satisfied, the first game field being displayed in the first display and the second game field being displayed in the second display; and performing control of moving the moving object from the first game field to the second game field when the movement permission condition has been satisfied.

An image generation method for generating an image according to a sixth aspect of the invention comprises:

controlling display of game images displayed in first and second displays;

controlling movement of a moving object;

determining whether or not a passage condition for the moving object to pass through a path from a first game field to a second game field has been satisfied, the first game field being displayed in the first display and the second game field being displayed in the second display; and performing control of moving the moving object from the first game field to the second game field when the passage condition has been satisfied.

DETAILED DESCRIPTION OF THE EMBODIMENT

Figure 1:
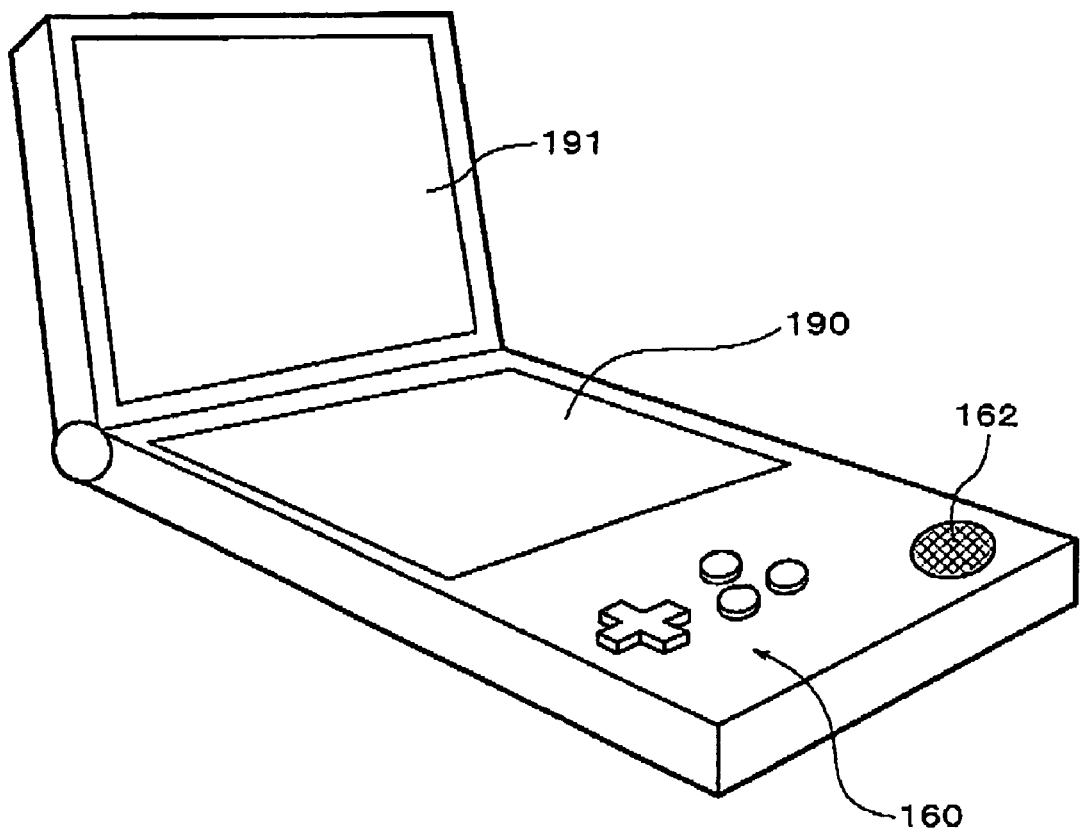
FIG. 1 is an example of a diagram showing the external appearance of an image generation system according to one embodiment of the invention.

The invention may provide a program product, an image generation system, and an image generation method enabling effective utilization of displays.

One embodiment of the invention provides an image generation system which generates an image, the system comprising:

a display control section which controls display of images displayed in first and second displays;

a movement control section which controls movement of a moving object;

a game calculation section which performs processing of calculating a game parameter which changes as a result of game play using the moving object; and a movement permission condition determination section which determines, based on the game parameter which changes as a result of game play in a first game field, whether or not a movement permission condition for permitting movement of the moving object from the first game field to a second game field has been satisfied, the first game field being displayed in the first display and the second game field being displayed in the second display, wherein the movement control section performs control of moving the moving object from the first game field to the second game field when the movement permission condition has been satisfied.

Another embodiment of the invention relates to a program product which causes a computer to function as each of the above sections, or to an image generation method.

According to one embodiment of the invention, whether or not the movement permission condition for moving the moving object from the first game field to the second game field has been satisfied is determined based on the game parameter (e.g. score, points, or item acquired) which changes as a result of game play in the first game field. When the movement permission condition has been satisfied, the moving object can move from the first game field to the second game field. Therefore, the moving object which has moved in the first game field in the first display can be caused to appear in the second game field in the second display, whereby the displays can be effectively utilized.

The image generation system, program product and image generation method according to these embodiments may include (or cause the computer to function as):

a passage condition determination section which determines whether or not a passage condition for the moving object to pass through a path from the first game field to the second game field has been satisfied when the movement permission condition has been satisfied, and the movement control section may perform control of moving the moving object from the first game field to the second game field when the passage condition has been satisfied.

This enables the moving object to be moved from the first game field to the second game field after determining whether or not the passage condition has been satisfied in addition to the movement permission condition.

With the image generation system, program product and image generation method according to these embodiments, the passage condition determination section may perform a hit check between a passage determination hit area and the moving object, and may determine that the passage condition has been satisfied when determining that the moving object has hit the hit area.

However, whether or not the passage condition has been satisfied may be determined by using another hit check method.

The image generation system, program product and image generation method according to these embodiments may include (or cause the computer to function as) an object change section which changes at least one of a size and a shape of the moving object according to the path when the moving object passes through the path.

This enables generation of a more natural image when the moving object moves to the second game field.

With the image generation system, program product and image generation method according to these embodiments, the display control section may perform control of causing an obstacle which has been displayed in the path to be non-display when the movement permission condition has been satisfied.

This enables the player to be effectively notified that the movement permission condition has been satisfied.

The image generation system, program product and image generation method according to these embodiments may include (or cause the computer to function as) a counter section which counts down a time limit, and the movement control section may perform control of moving the moving object from the first game field to the second game field when the movement permission condition has been satisfied within the time limit.

This causes the player to become more involved in game play for satisfying the movement permission condition.

With the image generation system, program product and image generation method according to these embodiments, when the moving object has moved from the first game field to the second game field, the game calculation section may perform at least one of processing of causing the moving object to acquire an item, processing of changing a score or points, processing of changing status of the moving object, and processing of causing a player to play a game differing from the game in the first game field.

This provides the player with effective motivation to move the moving object to the second game field.

One embodiment of the invention provides an image generation system which generates an image, the system comprising:

a display control section which controls display of game images displayed in first and second displays;

a movement control section which controls movement of a moving object; and a passage condition determination section which determines whether or not a passage condition for the moving object to pass through a path from a first game field to a second game field has been satisfied, the first game field being displayed in the first display and the second game field being displayed in the second display, wherein the movement control section performs control of moving the moving object from the first game field to the second game field when the passage condition has been satisfied.

According to one embodiment of the invention, whether or not the passage condition for the moving object to pass through the path from the first game field to the second game field has been satisfied is determined, and the moving object moves from the first game field to the second game field when the passage condition has been satisfied. Therefore, the moving object which has moved in the first game field in the first display can be caused to appear in the second game field in the second display, whereby the displays can be effectively utilized.

With the image generation system, program product and image generation method according to these embodiments, the passage condition determination section may perform a hit check between a passage determination hit area and the moving object, and may determine that the passage condition has been satisfied when determining that the moving object has hit the hit area.

However, whether or not the passage condition has been satisfied may be determined by using another hit check method.

The image generation system, program product and image generation method according to these embodiments may include (or cause the computer to function as) an object change section which changes at least one of a size and a shape of the moving object according to the path when the moving object passes through the path.

This enables generation of a more natural image when the moving object moves to the second game field.

The image generation system, program product and image generation method according to these embodiments may include (or cause the computer to function as) a shape recognition section which performs processing of recognizing an input shape input by a player, and when the input shape input by the player has been recognized to be a moving object shape, the display control section may perform control of generating and displaying a moving object corresponding to the input shape input by the player.

This allows the player to enjoy a game by causing a moving object having a desired shape to be generated in the first game field.

Note that the embodiments described hereunder do not in any way limit the scope of the invention defined by the claims laid out herein. Note also that not all of the elements of these embodiments should be taken as essential requirements to the means of the present invention.

1. Configuration

FIG. 1 is a diagram showing the external appearance of an image generation system according to one embodiment of the invention. The image generation system includes a touch panel display 190 which is a first display, and a display 191 which is a second display. The image generation system also includes an operation section 160 (operation panel) such as a direction key (cross key) and buttons, and a sound input device 162 (microphone) which allows a player to input sound (voice).

Various images (game image or display object) are displayed in the touch panel display 190 and the display 191. Specifically, an image of a player's character (moving object in a broad sense) operated by the player, an enemy character (moving object or target object in a broad sense), background, or the like is displayed in the touch panel display 190 and the display 191. An image indicating various types of game state information such as the score, points, and status is also displayed in the touch panel display 190 and the display 191.

The player performs a game operation, such as causing a character to be generated, controlling the movement (motion) of a character, or inputting a command, by touching the touch panel display 190 to draw a desired input shape (locus shape or sign) in the touch panel display 190. The touch operation (touch input) for the touch panel display 190 may be performed by using an input device such as a pen, or may be performed by the finger. The player may perform the game operation by operating the direction key and the buttons of the operation section 160, or inputting voice to the sound input device 162.

FIG. 1 shows the case of applying one embodiment of the invention to a portable game device. However, one embodiment of the invention may also be applied to an arcade game device (device which allows the player to play a game upon payment of a charge (fee)), a consumer game device other than a portable game device, and the like.

Figure 2:
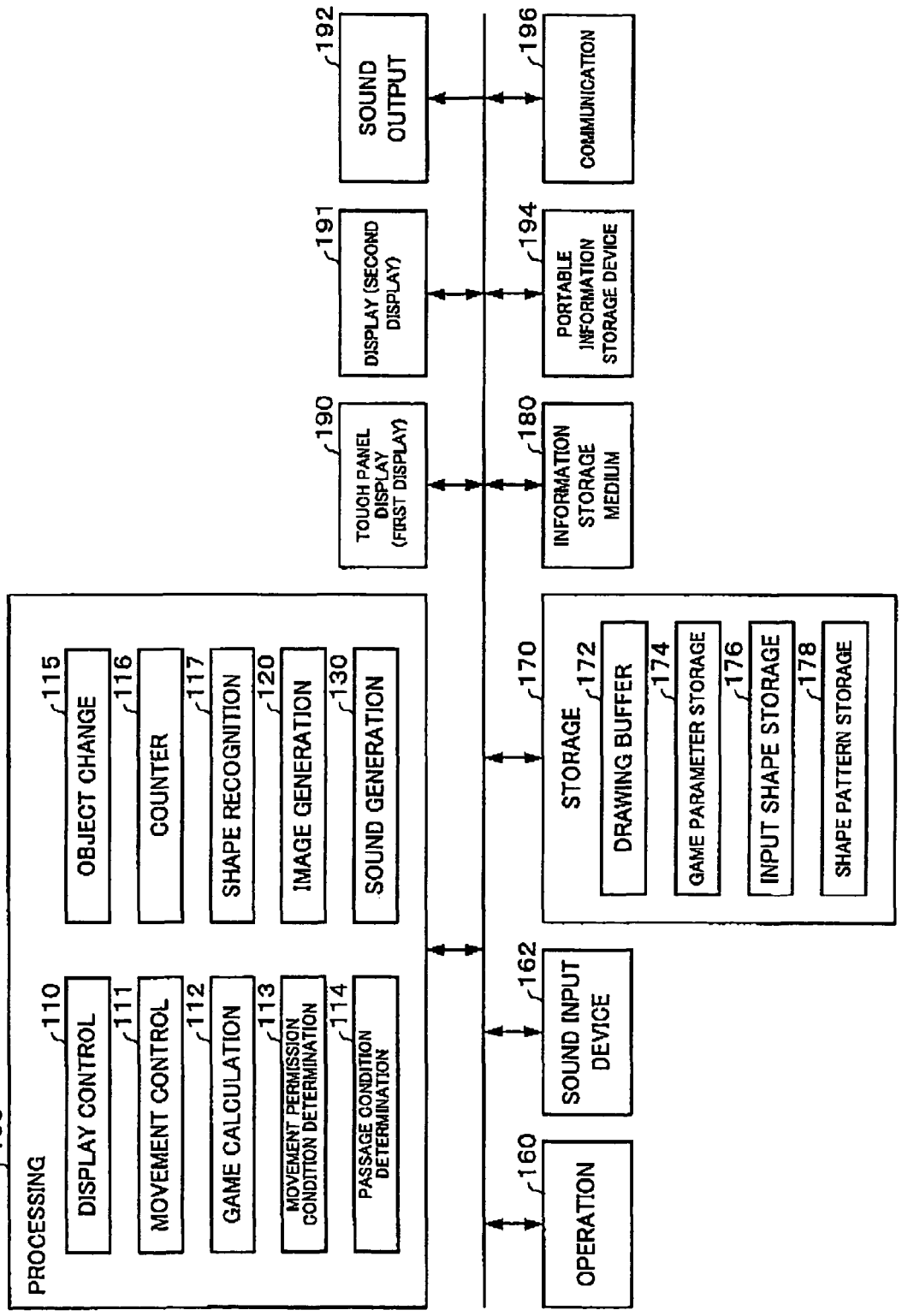
FIG. 2 is an example of a functional block diagram of an image generation system according to one embodiment of the invention.

FIG. 2 shows an example of a functional block diagram of the image generation system according to one embodiment of the invention. The image generation system according to one embodiment of the invention may be configured to exclude some of the constituent elements (sections) shown in FIG. 2.

The operation section 160 allows the player to input operation data. The function of the operation section 160 may be realized by a direction key, a button, a lever, or the like. The sound input device 162 allows the player to input sound such as voice or a clap. The function of the sound input device 162 may be realized by a microphone or the like. A storage section 170 functions as a work area for a processing section 100, a communication section 196, and the like. The function of the storage section 170 may be realized by a RAM (VRAM) or the like.

An information storage medium 180 (computer-readable medium; example of program product) stores a program, data, and the like. The function of the information storage medium 180 may be realized by an optical disk (CD or DVD), a memory card, a hard disk, a memory (ROM), or the like. The processing section 100 performs various types of processing according to one embodiment of the invention based on a program (data) stored in the information storage medium 180. Specifically, a program for causing a computer to function as each section according to one embodiment of the invention (program for causing a computer to execute processing of each section) is stored in the information storage medium 180.

The touch panel display 190 (first display in a broad sense) allows the player to perform a game operation or displays an image generated according to one embodiment of the invention. As the touch panel method, a resistive film method (four-wire type or five-wire type), an electrostatic capacitive coupling method, an ultrasonic surface acoustic wave method, an infrared scanning method, and the like can be given. As the game operation, an operation of causing an object (e.g. player's character, enemy character, or background) to be generated, an operation of controlling the movement (motion) of the object, an operation of inputting a command for proceeding with a game or issuing various instructions, an operation of inputting various types of information (e.g. player information, character (letter) information, or figure information), and the like can be given. An image of a moving object (e.g. player's character, enemy character, ball, or item), a background object, a game field (game space or object space), or the like may be displayed in the touch panel display 190. An image which provides the player with various types of game state information (e.g. status, score, points, or time limit) may be displayed in the touch panel display 190. A display other than the touch panel display may be used as the first display.

The display 191 (second display in a broad sense) displays an image generated according to one embodiment of the invention. The function of the display 191 may be realized by a liquid crystal display (LCD), a CRT, an organic EL display, or the like. A touch panel display may be used as the second display.

A sound output section 192 outputs sound generated according to one embodiment of the invention. The function of the sound output section 192 may be realized by a speaker, a headphone, or the like.

A portable information storage device 194 stores player's personal data, game save data, or the like. As the portable information storage device 194, a memory card or the like may be used. The communication section 196 performs various types of control for communicating with the outside (e.g. host device or another image generation system). The function of the communication section 196 may be realized by hardware such as various processors or communication ASIC, a program, or the like.

A program (data or program product) for causing a computer to function as each section according to one embodiment of the invention may be distributed to the information storage medium 180 (storage section 170) from an information storage medium provided in a host device (server) through a network and the communication section 196. Use of the information storage medium of the host device (server) is also included within the scope of the invention.

The processing section 100 (processor) performs game calculation processing, image generation processing, sound generation processing, or the like based on operation data from the operation section 160, a program, or the like. The processing section 100 performs various types of processing using the storage section 170 as a work area. The function of the processing section 100 may be realized by hardware such as various processors (e.g. CPU or DSP) or ASIC (e.g. gate array) and a program.

The processing section 100 includes a display control section 110, a movement control section 111, a game calculation section 112, a movement permission condition determination section 113, a passage condition determination section 114, an object change section 115, a counter section 116, a shape recognition section 117, an image generation section 120, and a sound generation section 130. The processing section 100 may be configured to exclude some of these sections.

The display control section 110 controls display of an image (object) displayed in the touch panel display 190 and the display 191 (first and second displays). In more detail, the display control section 110 performs display control such as generating a display target object (e.g. character, target, car, ball, item, building, tree, pillar, wall, or map), indicating display of an object and the display position, or causing an object to disappear. Specifically, the display control section 110 performs display control such as registering a generated object in an object list, transferring the object list to the image generation section 120 or the like, or deleting a disappeared object from the object list, for example.

The movement control section 111 performs processing of moving an object (two-dimensional or three-dimensional object) in a game field (game space or two-dimensional or three-dimensional object space). Specifically, the movement control section 111 performs processing of moving an object based on operation data input by the player using the operation section 160 or the touch panel display 190, a program (movement algorithm), various types of data (object list), or the like. In more detail, the movement control section 111 performs processing of sequentially calculating object movement information (position, rotational angle, speed, or acceleration) in frame ($1/60$ sec) units. The movement control section 111 (motion control section) may perform processing of causing an object to take action. Specifically, the movement control section 111 performs processing of causing an object to take action (motion or animation) based on operation data input by the player using the operation section 160 or the touch panel display 190, a program (motion algorithm), various types of data (motion data or animation data), or the like. In more detail, the movement control section 111 performs processing of sequentially calculating object motion information (position, rotational angle, or shape of each part object) in frame ($1/60$ sec) units. The frame is a time unit for performing object movement control processing or motion control processing or image generation processing.

The game calculation section 112 performs game calculation processing of generating a game image and game sound. As the game calculation processing, processing of determining the game content or game mode, processing of starting a game when game start conditions are satisfied, processing of proceeding with a game, processing of calculating a game parameter (game result) which changes as a result of game play, processing of stopping a game when game finish conditions are satisfied, and the like can be given.

The game parameter (game result parameter or game state parameter) is a variable or a flag which changes as a result of game play using a moving object or the like. Specifically, the game parameter is a variable or a flag of which the value changes corresponding to the player's game results (temporary results or final results) or progress of a game. The game parameter is declared as a variable or a flag in a program, for example. When a game is in progress, the value of the game parameter updated at any time is stored and retained in a game parameter storage section 174. As the game parameter, a parameter for indicating the score or points of the player (temporary results or final results of a game), a parameter (flag) for indicating the type or the number of enemies beaten by the player, a parameter (flag) for indicating the type or the number of items acquired by the player, a parameter for indicating the status (ability or level) of the player (character), a parameter for indicating the degree of progress of a game (number of game stages cleared or remaining time limit), a parameter (flag) for indicating the type or the number of game events (conversation event, fighting start event, stage clear event, or scenario branch event) occurring during a game, and the like can be given.

The movement permission condition determination section 113 performs processing of determining whether or not a condition for permitting movement of a moving object from a first game field displayed in the touch panel display 190 to a second game field displayed in the display 191 (or movement from the second game field to the first game field) has been satisfied. The game field is a field in which a moving object can move, and is a field in which the player plays a game (game space, two-dimensional or three-dimensional object space, or game stage). The first and second game fields may be completely independent game fields (fields in which different games are performed), or one game field may be displayed by combining the first and second game fields.

The movement permission condition is a condition for permitting (enabling) movement of a moving object from the first game field to the second game field (or, from the second game field to the first game field). A moving object may be unconditionally moved (automatically moved) from the first game field to the second game field when the movement permission condition has been satisfied, or a moving object may be moved from the first game field to the second game field when another condition (e.g. passage condition) has been satisfied in addition to the movement permission condition.

In one embodiment of the invention, whether or not the movement permission condition has been satisfied is determined based on the game parameter (game results in the first game field) which changes as a result of game play in the first game field. In more detail, it is determined that the movement permission condition has been satisfied when the score (or points) has reached a specific (given) value, when a specific enemy has been beaten or a specific number of enemies have been beaten, when a specific item has been acquired or a specific number of items have been acquired, when the status (ability or level) has reached a specific value or a specific status has been acquired, when a game has progressed to a specific point (game stage), or when a specific game event has occurred or a specific number of game events have occurred. The movement control section 111 controls movement of a moving object from the first game field to the second game field when the movement permission condition has been satisfied. The display control section 110 performs processing of causing an obstacle displayed in a path to be non-display (processing of deleting an obstacle object from the object list) when the movement permission condition has been satisfied.

The passage condition determination section 114 performs processing of determining whether or not a passage condition for a moving object to move from the first game field to the second game field (or, from the second game field to the first game field) has been satisfied when the movement permission condition has been satisfied.

The passage condition is a condition for a moving object to pass through a path (virtual path, entrance, passage, or moving path) from the first game field to the second game field (or, from the second game field to the first game field). In one embodiment of the invention, the passage condition determination section 114 (hit check section) performs a hit check between a passage determination hit area (linear area, two-dimensional area, or three-dimensional area) and a moving object. The passage condition determination section 114 determines that the passage condition has been satisfied when determining that a moving object has hit the passage determination hit area (hit area set according to the size or position of the path). The movement control section 111 controls movement of a moving object from the first game field to the second game field when the passage condition has been satisfied in addition to the movement permission condition.

The object change section 115 performs processing of changing at least one of the size and the shape of a moving object. In more detail, the object change section 115 changes at least one of the size and the shape of a moving object when a moving object passes through the path. In still more detail, the object change section 115 performs processing of reducing or expanding a moving object according to the size of the path. Or, the object change section 115 changes the shape of a moving object according to the size or the shape of the path. The expansion-reduction processing may be realized by coordinate transformation processing (coordinate transformation processing of each point of an object) or the like. The processing of changing the shape of a moving object may be realized by changing an animation pattern or motion data.

The counter section 116 performs time limit count processing. For example, the counter section 116 performs count processing of decrementing the time limit each time one frame has elapsed. The movement control section 111 performs control of moving a moving object from the first game field to the second game field (or, from the second game field to the first game field) on condition that the movement permission condition (passage condition) has been satisfied within the time limit counted by the counter section 116. In more detail, when the movement permission condition has not been satisfied within the time limit, the movement control section 111 clears the value of the game points which have been accumulated in order to satisfy the movement permission condition (e.g. score, point, number of enemies beaten, or number of items acquired).

The shape recognition section 117 performs processing of recognizing an input shape input by the player. In more detail, the shape recognition section 117 performs processing of matching the input shape (handwritten shape) input by the player using the touch panel display 190 against a shape pattern provided in advance to recognize the input shape input by the player. In more detail, when the player inputs a desired shape using the touch panel display 190, the shape recognition section 117 stores coordinate data of the touch position and angle data of the angle formed by the line segments connecting the touch positions in an input shape storage section 176 as input shape data. The shape recognition section 117 then performs processing of matching (collating) the input shape (angle data group) stored in the input shape storage section 176 against a shape pattern (angle data group) registered in a shape pattern storage section 178 as dictionary data. Specifically, the shape recognition section 117 calculates the similarity between the angle data of the input shape and the angle data of the shape pattern. When the shape recognition section 117 determines that the input shape is identical or almost identical to a specific shape pattern based on the similarity calculated, the shape recognition section 117 determines that the input shape matches the specific shape pattern.

When the input shape matches the registered shape pattern (linear shape, circular shape, or moving object shape) and the input shape is recognized, the shape recognition section 117 performs processing corresponding to the recognized shape.

For example, when the input shape is recognized to be a linear shape, the passage condition determination section 114 performs a hit check between the linear shape and a moving object. When the linear shape has hit the moving object, the movement control section 111 performs processing of changing the moving direction of the moving object.

When the input shape is recognized to be a moving object shape, the display control section 110 generates and displays a moving object corresponding to the input shape. The moving object corresponding to the input shape is a moving object of which the shape and the size are identical or almost identical to those of the input shape.

For example, a moving object having the same shape as the shape input by the player can be displayed by generating and displaying a moving object by directly using the input shape data (touch position data). In this case, an animation may be displayed by replacing only a part of the input shape (e.g. mouth) with another shape. A moving object having a shape similar to the input shape can be displayed by searching for a moving object having a model shape which matches the input shape and generating and displaying the moving object having the model shape. In this case, when the input shape input by the player is large, a large moving object is selected from moving objects having the model shape, and the selected moving object is displayed.

The image generation section 120 performs drawing processing based on the results of various types of processing (game processing) performed by the processing section 100 to generate an image, and outputs the image to the touch panel display 190 or the display 191. In this case, an image generated by the image generation section 120 may be a two-dimensional image or a three-dimensional image. When generating a three-dimensional image, geometry processing such as coordinate transformation (world coordinate transformation or camera coordinate transformation), clipping processing, or perspective transformation is performed, and drawing data (e.g. positional coordinates of vertices of a primitive surface, texture coordinates, color data, normal vector, or alpha-value) is created based on the processing results. An object (one or more primitive surfaces) after perspective transformation (after geometry processing) is drawn in a drawing buffer 172 (buffer which can store image information in pixel units, such as a frame buffer or an intermediate buffer; VRAM) based on the drawing data (primitive surface data). This causes an image viewed from a virtual camera (given viewpoint) to be generated in the object space.

The sound generation section 130 performs sound processing based on the results of various types of processing performed by the processing section 100 to generate game sound such as background music (BGM), effect sound, or voice, and outputs the game sound to the sound output section 192.

The image generation system according to one embodiment of the invention may be a system dedicated to a single-player mode in which only one player can play a game, or may be a system provided with a multi-player mode in which two or more players can play a game. When two or more players play a game, game images and game sound provided to the players may be generated by using one terminal, or may be generated by distributed processing by using two or more terminals (game device or portable telephone) connected through a network (transmission line or communication line), for example.

2. Method of Embodiment

A method according to one embodiment of the invention is described below with reference to the drawings. The following description illustrates the case of applying one embodiment of the invention to a game in which a player scores by causing a player's character to hit and eat an enemy character. However, the game to which one embodiment of the invention may be applied is not limited to such a game.

2.1 Operation Using Touch Panel Display

Figure 3:
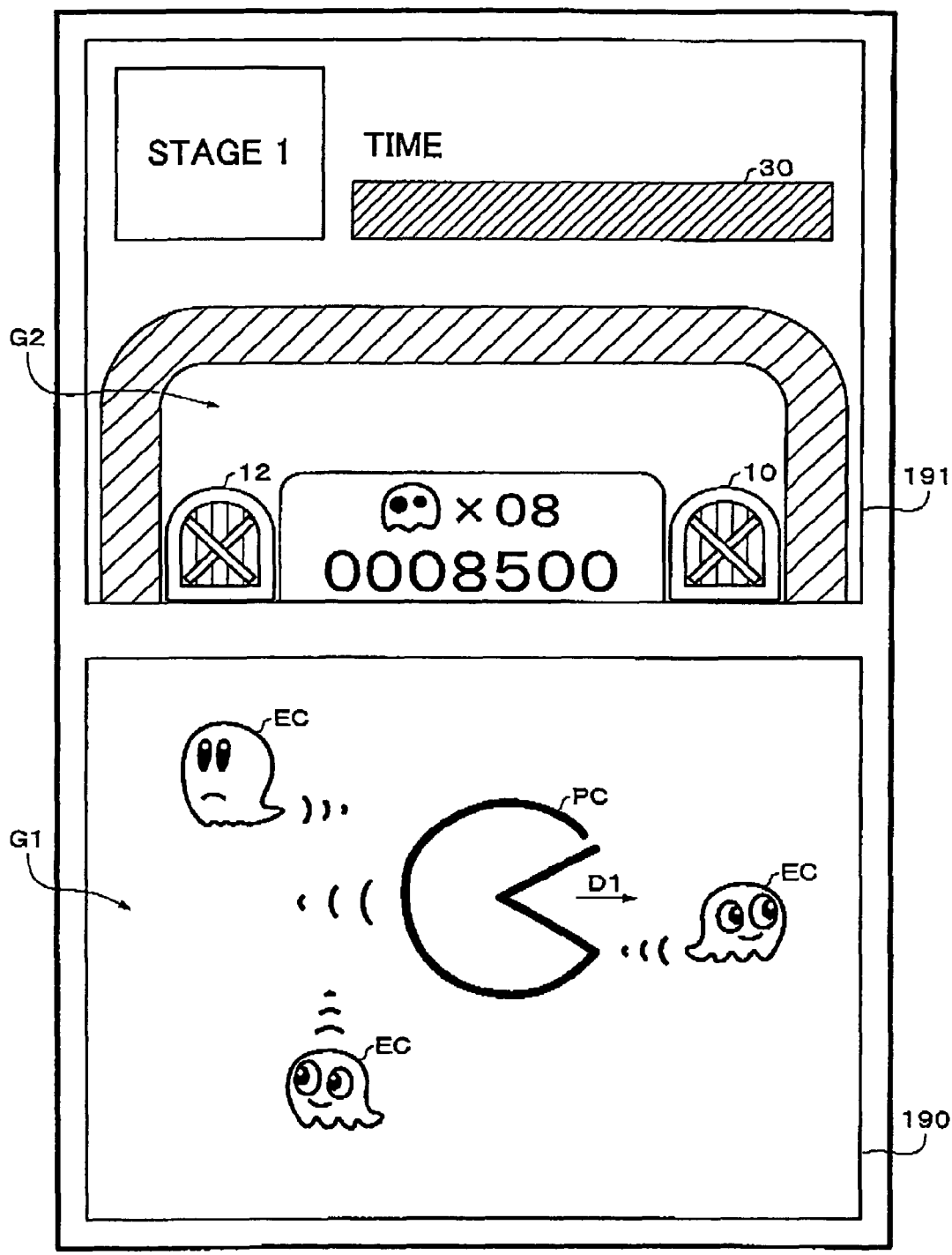
FIG. 3 is an example of a game image illustrative of a method according to one embodiment of the invention.

FIG. 3 shows an example of a game image generated according to one embodiment of the invention. A game field G1 is displayed in the touch panel display 190 (first display), and a game field G2 is displayed in the display 191 (second display). The player causes a player's character PC (moving object) to be generated in the game field G1 by touch input (input by finger or pen) using the touch panel display 190. The generated player's character PC moves in the game field G1. In more detail, the player's character PC moves in a direction D1 toward which the mouth of the player's character PC is open. When the player inputs a linear shape using the touch panel display 190 and the player's character PC hits the linear shape, the moving direction of the player's character PC is changed to the drawing direction of the linear shape (direction from the starting point toward the end point). When the player touches the touch panel display 190 within a given range (hit box) including the position of the player's character PC using a pen or by the finger, the player's character PC stops at that position.

As described above, the player causes the player's character PC to be generated by touch input using the touch panel display 190, and controls the moving direction of the player's character or the like using the touch panel display 190. When the player's character PC hits an enemy character EC, the player's character PC eats the enemy character EC so that the player scores. In this case, the hit check may be realized by using a hit box (e.g. quadrangle or circle) set for the player's character PC or a hit box set for the enemy character EC.

Figure 4:
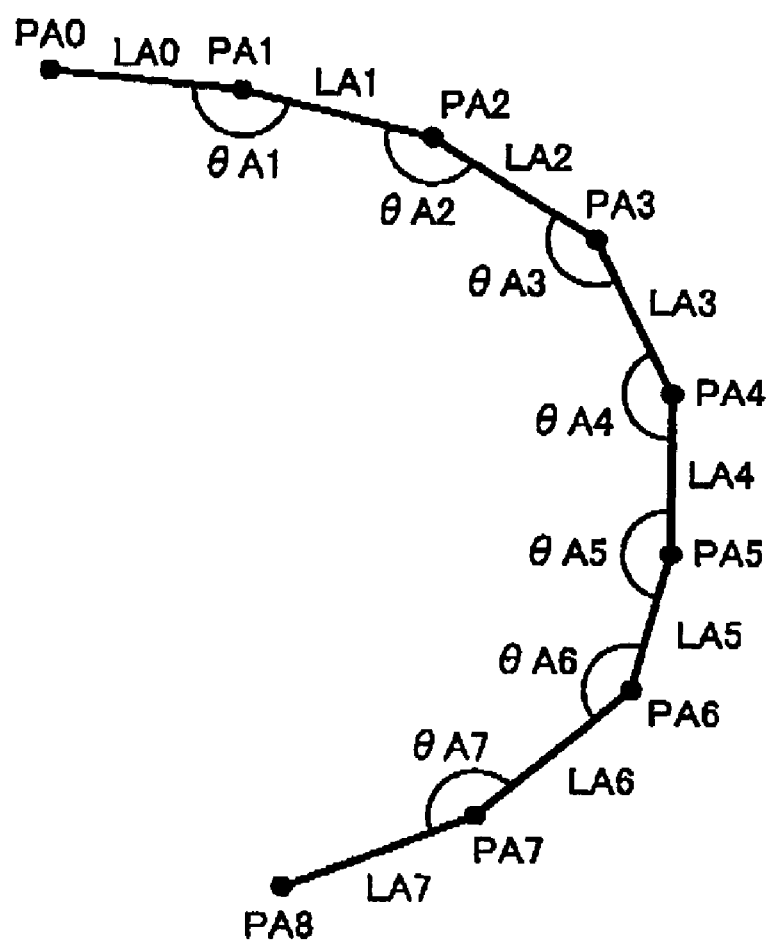
FIG. 4 is a diagram illustrative of input shape recognition processing.

A shape input method using the touch panel display 190 is described below with reference to FIGS. 4 and 5. In FIG. 4, PA0 indicates the starting point (pen-down position) of the touch position, and PA8 indicates the end point (pen-up position) of the touch position. When the player performs touch input, the coordinate data of the touch positions PA0 to PA8 is acquired in frame (specific period) units, for example. Then, line segments LA0 to LA7 between the touch positions are calculated, and angles $\theta A1$ to $\theta A7$ between the line segments are calculated. For example, the line segment LA0 between the touch positions PA0 and PA1 and the line segment LA1 between the touch positions PA1 and PA2 are calculated, and the angle data $\theta A1$ of the angle formed by the line segments LA0 and LA1 is calculated. The coordinate data of the touch positions PA0 to PA8 and the angle data $\theta A1$ to $\theta A7$ are stored in the input shape storage section 176 as input shape data.

Then, the input shape is matched (collated) against a shape pattern registered in advance as dictionary data. A1, A2, and A3 of FIG. 5 indicate examples of the shape pattern. In FIG. 5, A1 indicates a linear shape pattern, A2 indicates a circular shape pattern, and A3 indicates a character (moving object) shape pattern. These shape patterns are made up of angle data $\theta B1$ to $\theta B7$.

The matching processing of the input shape and the shape pattern may be realized by performing a similarity calculation of the angle data $\theta A1$ to $\theta A7$ of the input shape and the angle data $\theta B1$ to $\theta B7$ of the shape pattern (model shape), for example. When the number of pieces of angle data of the input shape is not the same as the number of pieces of angle data of the shape pattern, the similarity calculation (matching processing) may be performed after making the number of pieces of angle data of the input shape the same as the number of pieces of angle data of the shape pattern by performing interpolation processing or thinning processing. When the input shape is determined to have a high degree of similarity (correlation) with a specific shape pattern, the input shape is determined to match the specific shape pattern. For example, when the input shape is determined to match the shape pattern indicated by A1, A2, or A3 in FIG. 5, the input shape is determined to be the linear shape, the circular shape, or the character shape.

Figure 5:
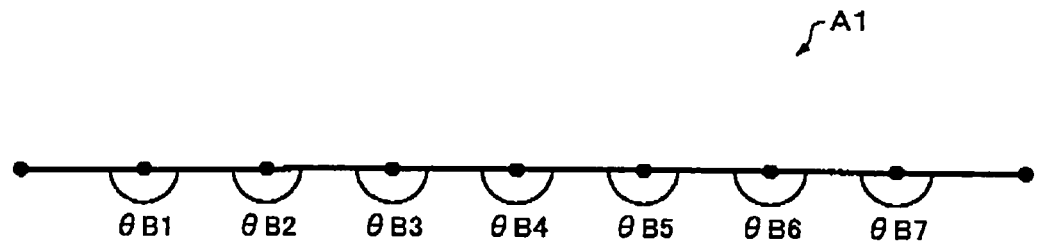
FIG. 5 is an example of a shape pattern registered in advance.
Figure 5:
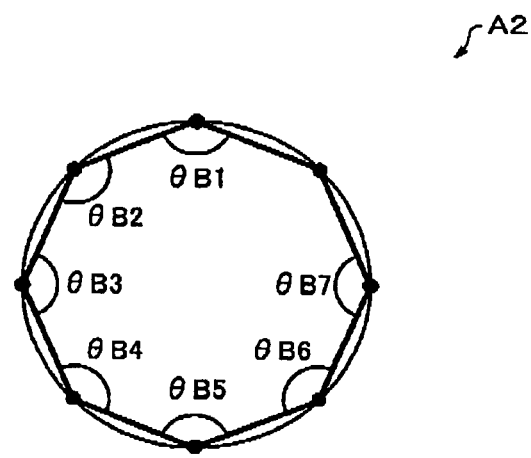
Figure 5:
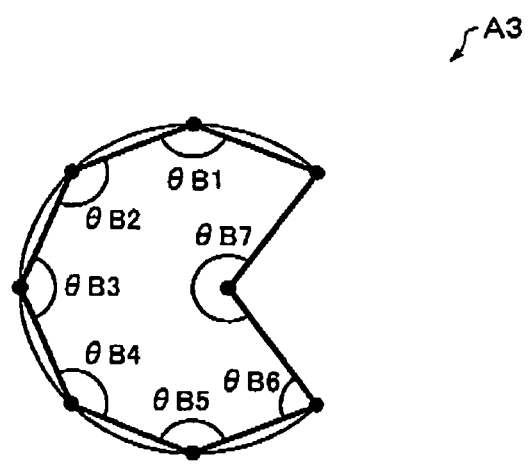

When the input shape is determined to be the linear shape indicated by A1 in FIG. 5 and the player's character PC hits the linear shape, the moving direction of the player's character PC is changed to the drawing direction of the linear shape (direction from the starting point toward the end point). When the input shape is determined to be the character shape indicated by A3 in FIG. 5, the player's character PC is generated and displayed in the game field G1 of the touch panel display 190, as shown in FIG. 3. The player may cause a plurality of player's characters to be generated in the game field G1. However, the player can score higher points when the player causes only one player's character to be generated and causes the player's character to hit the enemy character.

2.2 Movement Permission Condition

Figure 6:
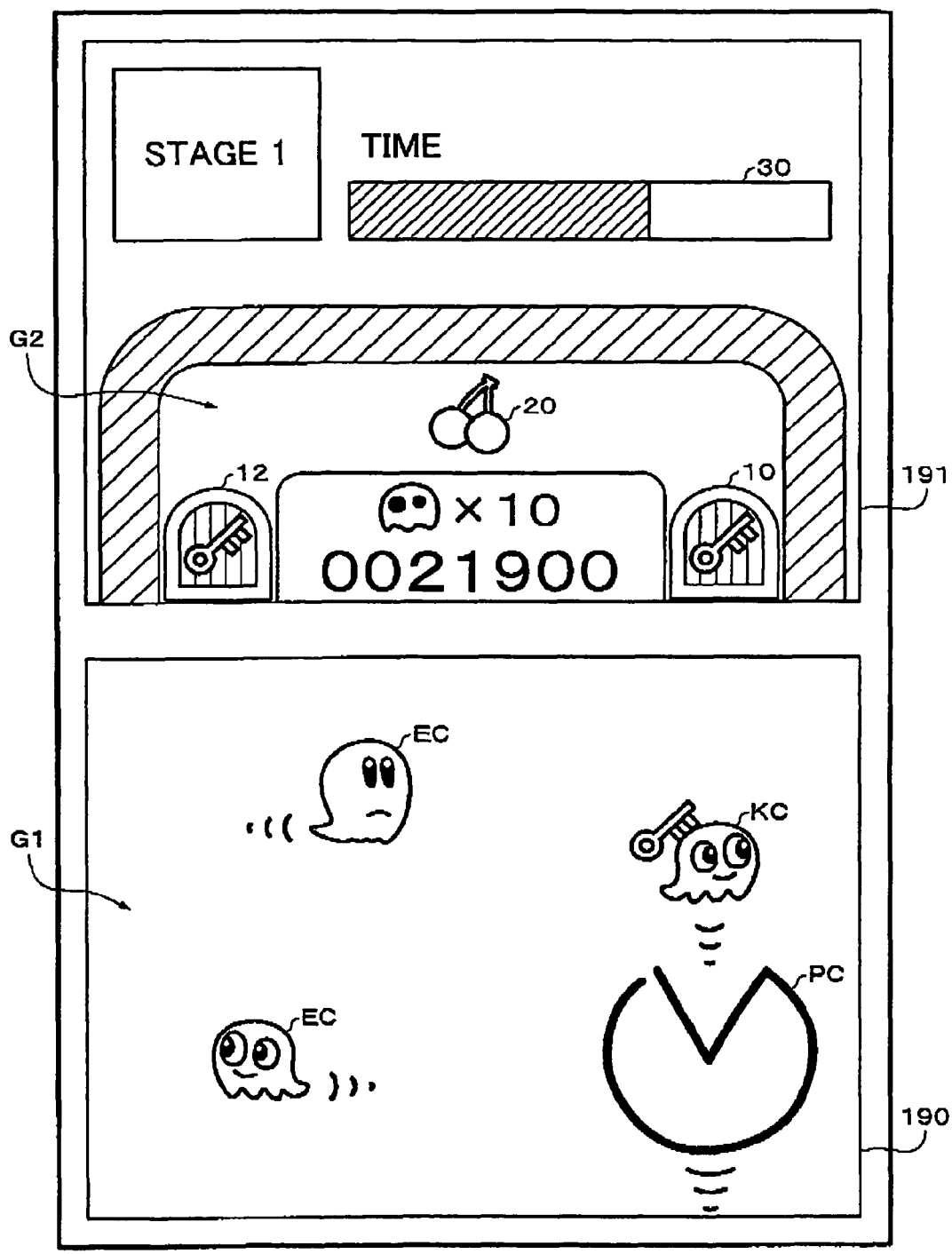
FIG. 6 is an example of a game image illustrative of a method according to one embodiment of the invention.

As shown in FIG. 6, when the number of enemy characters EC hit by the player's character PC reaches a specific number, images of doors 10 and 12 (obstacles) displayed in the game field G2 of the display 191 are changed. In more detail, the door without a key (keyhole) is changed into a door with a key. A special item 20 is displayed in the game field G2. A key character KC holding a key to the doors 10 and 12 appears in the game field G1. The time limit indicated by a time gauge 30 starts to be decremented.

Figure 7:
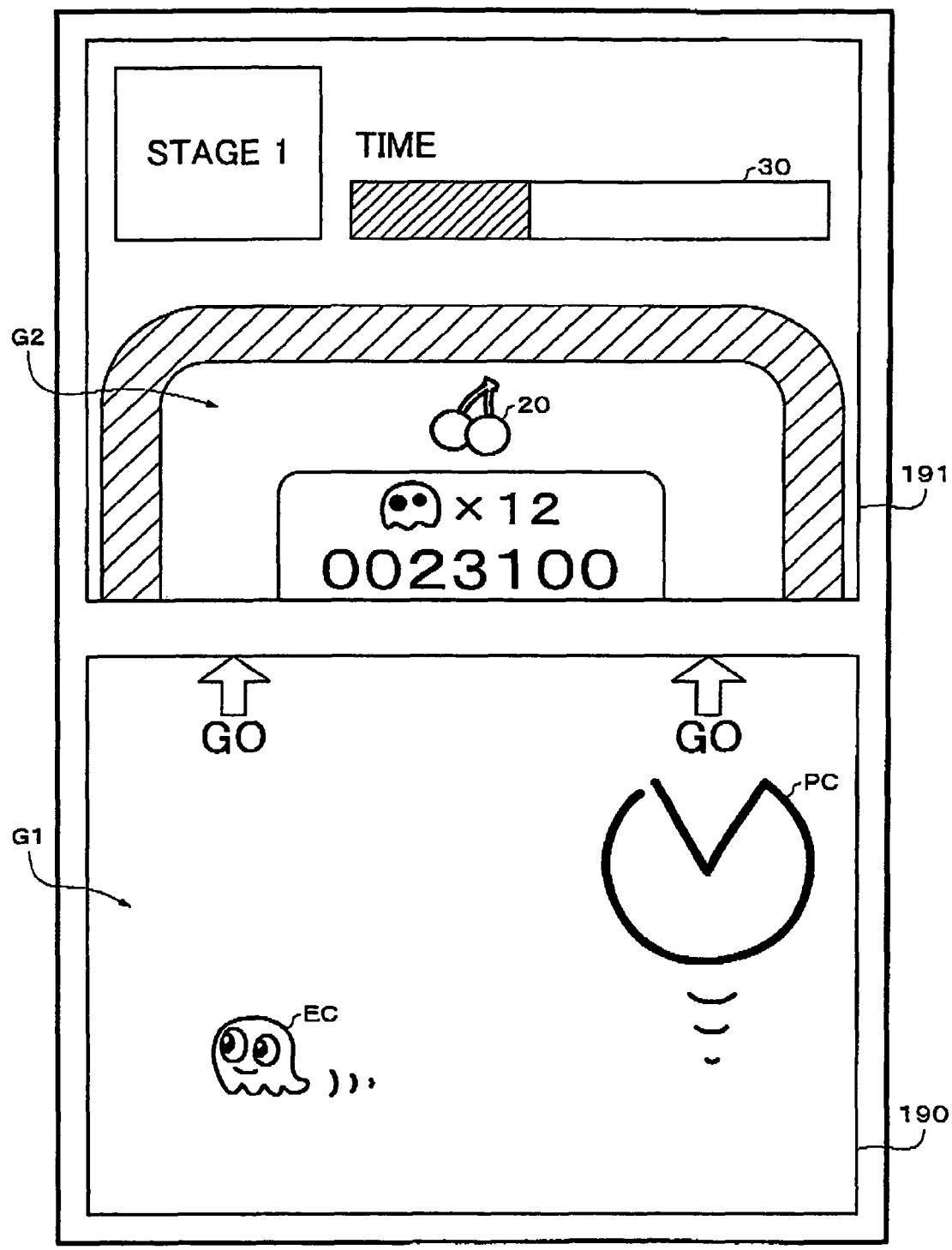
FIG. 7 is an example of a game image illustrative of a method according to one embodiment of the invention.

As shown in FIG. 7, when the player succeeds in causing the player's character PC to hit the key character KC within the time limit displayed in the time gauge 30, the movement permission condition for movement from the game field G1 to the game field G2 is satisfied. As a result, the doors 10 and 12 (obstacles) disappear (and become non-display) so that the player's character PC can move from the game field G1 to the game field G2.

When the passage condition described later is satisfied, the player's character PC moves from the game field G1 to the game field G2. In this case, the player's character PC is subjected to expansion-reduction processing so that the player's character PC fits into the path. When the player's character PC which has moved to the game field G2 hits the special item 20, the player can score bonus points. The player's character PC then automatically moves in the game field G2 and returns to the game field G1 from the game field G2. When the player's character PC has returned to the game field G1, the doors 10 and 12 (obstacles) appear again so that the player's character PC cannot move from the game field G1 to the game field G2.

Figure 8:
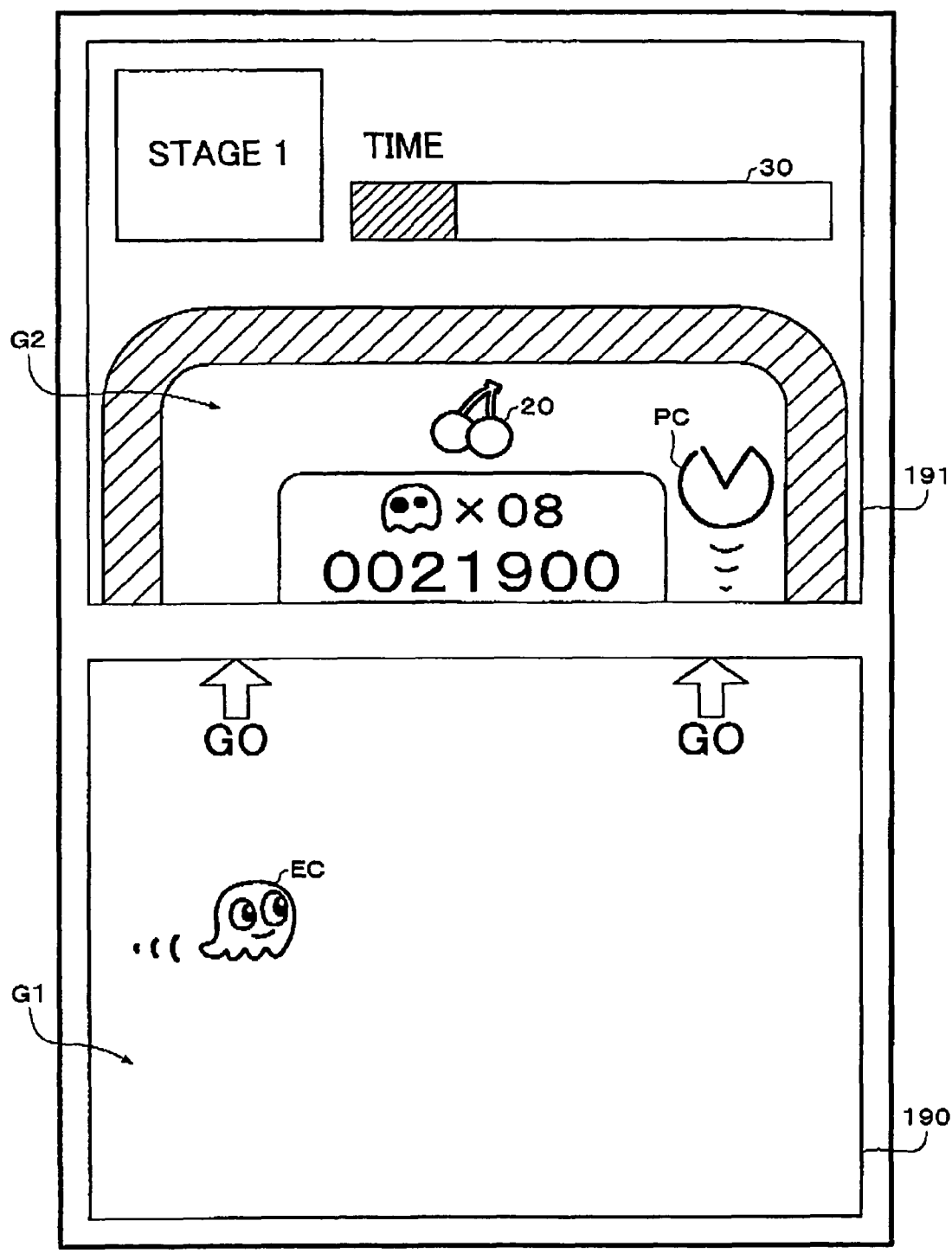
FIG. 8 is an example of a game image illustrative of a method according to one embodiment of the invention.

In FIG. 8, the processing of causing the player's character PC to acquire the special item 20 (given item) is performed when the player's character PC moves from the game field G1 to the game field G2. However, one embodiment of the invention is not limited thereto. For example, processing of changing the score (or points) may be performed when the player's character PC moves from the game field G1 to the game field G2. In more detail, the score (or points) of the player is increased or decreased. Or, processing of changing the status of the player's character PC may be performed. In more detail, the ability or level of the player's character PC (player) is increased or decreased. Or, processing of causing the player to play a game differing from the game in the game field G1 may be performed. In the game field G1, the player plays the game in which the player causes the player's character PC to hit the enemy character EC. In the game field G2, the player may play a game differing from the game in the game field G1 (e.g. a game in which the player competes for the number of items acquired, a game in which the player competes for the course running time, a maze game, a minigame, a card game, or a puzzle game).

As described above, according to one embodiment of the invention, when the movement permission condition has been satisfied, the player's character PC can move from the game field G1 to the game field G2. This increases the degree of variety of a game by effectively utilizing the two displays.

Specifically, in a related-art image generation system having two displays, the two displays are not effectively utilized, such as allowing the player to play a game in the first display and displaying the score or the like in the second display.

According to one embodiment of the invention, the second display 191 can be effectively utilized as the game field for the player's character PC in addition to displaying the score or the like. This increases the degree of variety of a game, whereby a new type of game can be realized. A problem occurs in which a game becomes monotonous when the player can play only the game in the game field G1. However, such a problem can be solved by allowing the player's character PC to move to the game field G2 when the movement permission condition has been satisfied.

It should be understood that various modifications and variations may be made as to the setting of the movement permission condition, the processing performed when the movement permission condition has been satisfied, and the like. For example, when the movement permission condition has been satisfied, the player's character PC may be unconditionally moved to the game field G1 or G2 even if the passage condition has not been satisfied.

Figure 9:
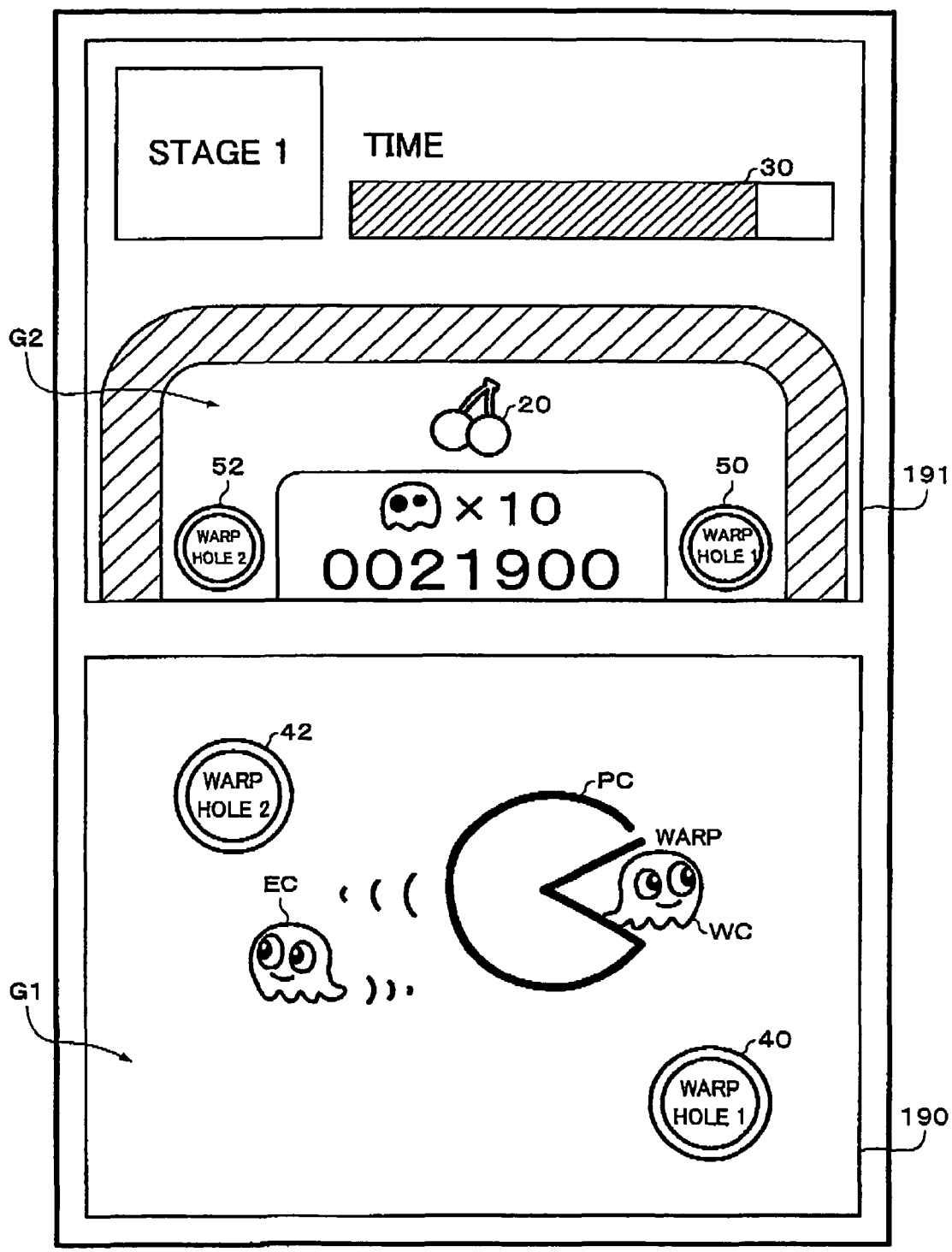
FIG. 9 is an example of a game image illustrative of a method according to one embodiment of the invention.

As shown in FIG. 9, warp holes 40 and 42 may be caused to appear when the movement permission condition has been satisfied. In FIG. 9, when the player's character PC hits and eats a warp character WC, the movement permission condition is satisfied so that the warp holes 40 and 42 appear in the game field G1. When the player's character PC enters the warp hole 40 or 42, the player's character PC moves to a warp hole 50 or 52 in the game field G2. This enables the player's character PC to acquire the special item 20. In this case, the player's character PC can return to the game field G1 through the warp hole 40 or 42 by entering the warp hole 50 or 52 in the game field G2.

Figure 10:
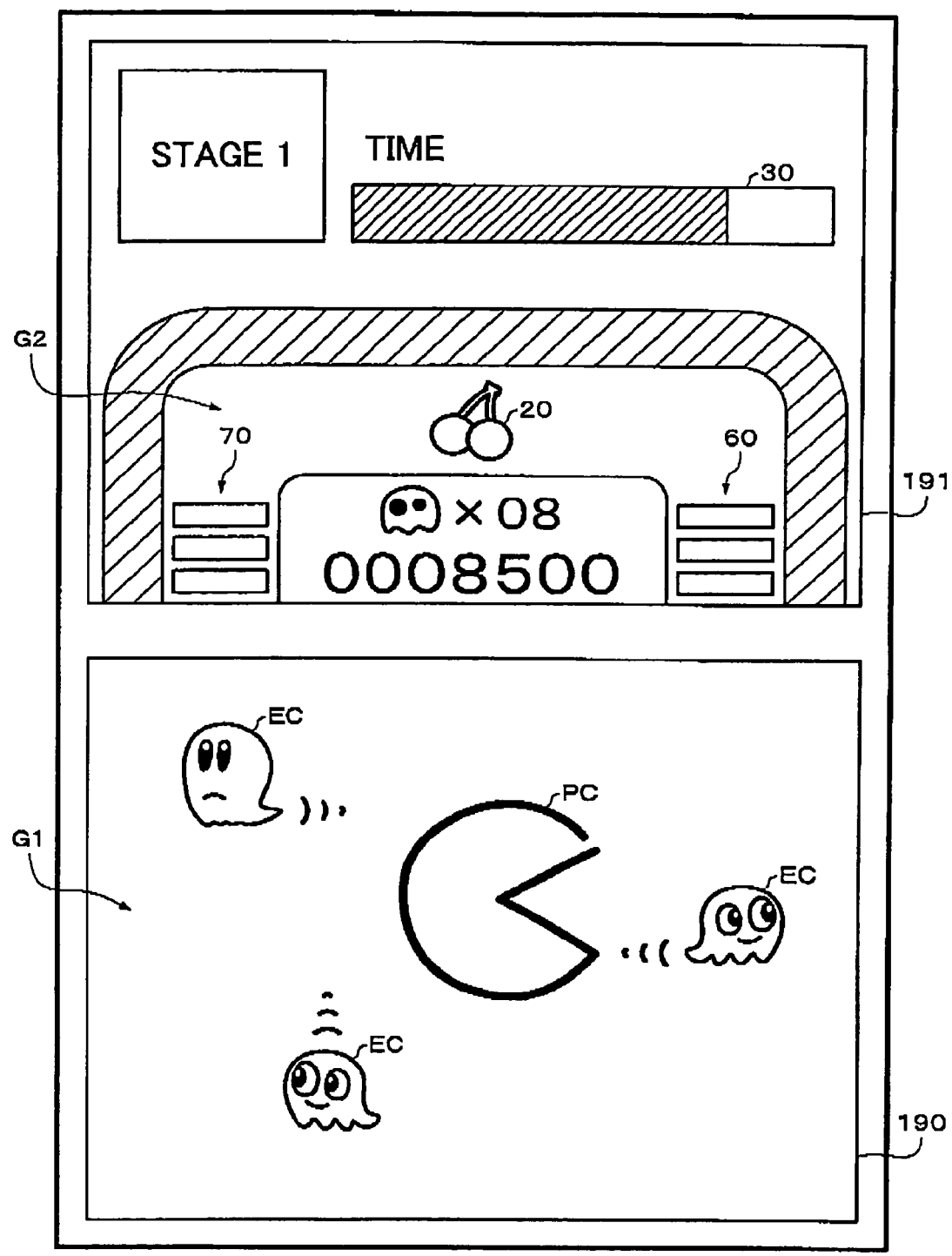
FIG. 10 is an example of a game image illustrative of a method according to one embodiment of the invention.
Figure 11:
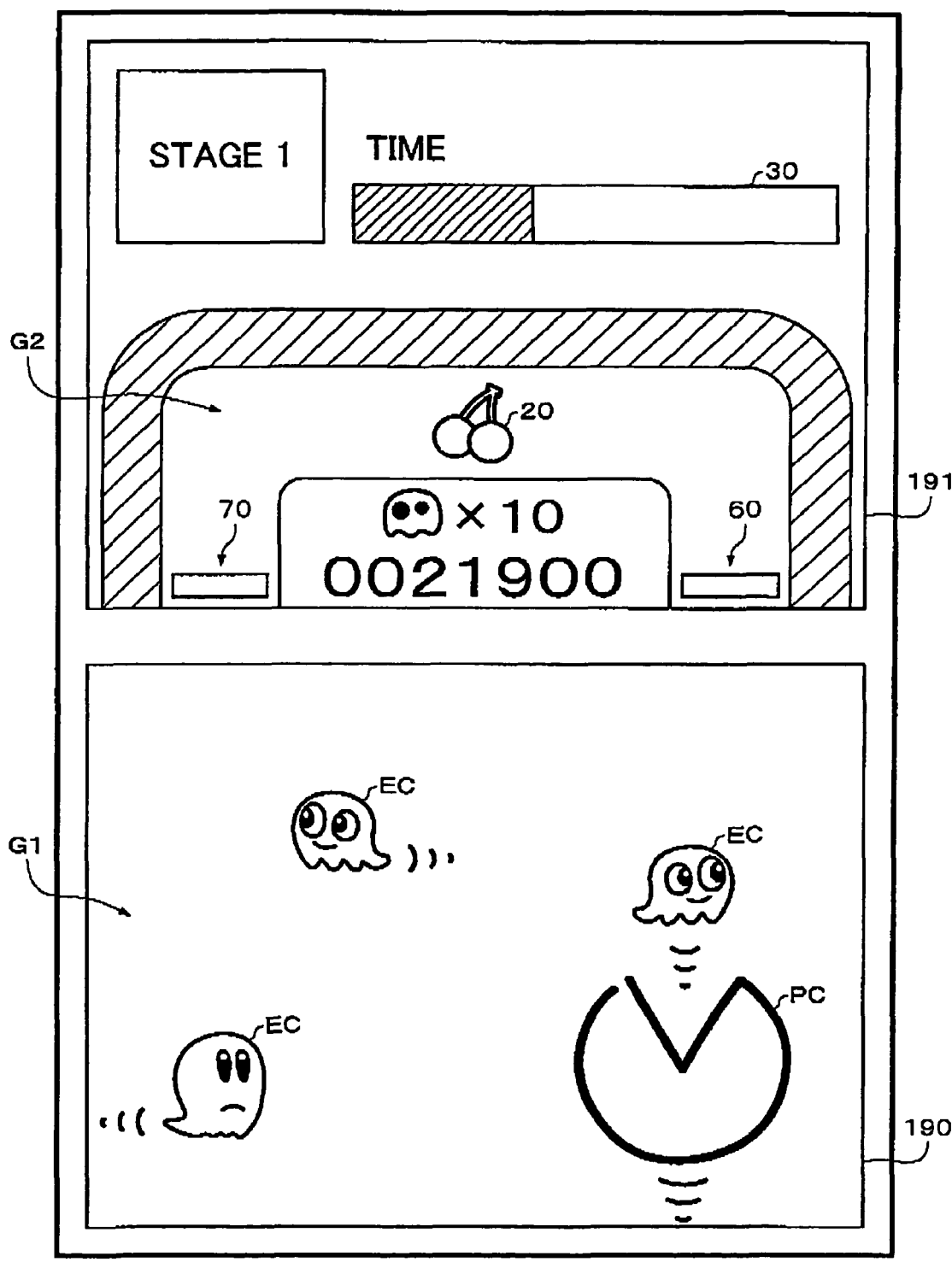
FIG. 11 is an example of a game image illustrative of a method according to one embodiment of the invention.

As shown in FIGS. 10 and 11, images of obstacles 60 and 70 may be gradually changed (caused to disappear) each time the player's character PC hits the enemy character EC. When the number of enemy characters EC hit by the player's character PC has reached a specific number, the movement permission condition is satisfied so that the images of the obstacles 60 and 70 completely disappear. This enables the player's character PC to move to the game field G2.

2.3 Passage Condition

In one embodiment of the invention, when the movement permission condition has been satisfied, whether or not the passage condition for the player's character PC (moving object) to pass through the path from the game field G1 to the game field G2 has been satisfied is determined. The player's character PC is moved from the game field G1 to the game field G2 on condition that the passage condition has been satisfied.

Figure 12A:
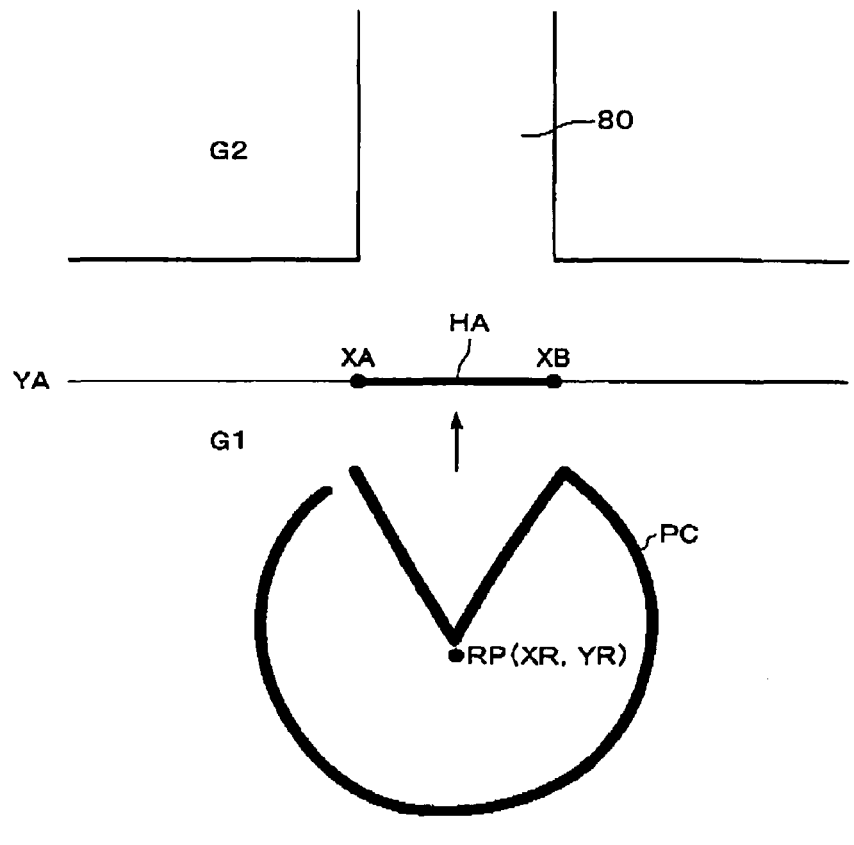
FIGS. 12A and 12B are diagrams illustrative of a passage condition determination method.

FIG. 12A shows a specific example of the passage condition determination method. In FIG. 12A, a passage determination hit area HA is set corresponding to a path 80. A hit check between the passage determination hit area HA and the player's character PC is performed. In more detail, the coordinates of a representative point RP of the player's character PC are compared with the coordinates of the hit area HA.

When the Y coordinate YR of the representative point RP coincides with the Y coordinate of the hit area HA, whether or not the value of the X coordinate XR of the representative point RP is a value between the X coordinates XA and XB of the hit area HA is determined. When XR<XA or XR>XB, the player's character PC is determined to be outside the game field G1, and the player's character PC is caused to disappear. Specifically, the player's character PC is deleted from the object list. When XA≦XR≦XB, the player's character PC is determined to hit the hit area HA to determine that the passage condition has been satisfied. The player's character PC is then moved from the game field G1 to the game field G2.

The player can be given an impression that the player's character PC moves from the game field G1 to the game field G2 through the path by moving the player's character PC from the game field G1 to the game field G2 after determining whether or not the passage condition has been satisfied in addition to the movement permission condition, whereby the sense of virtual reality of the player can be improved or the interest of the game can be increased.

The passage condition determination method is not limited to the method shown in FIG. 12A. For example, when the player's character PC is a three-dimensional object, the hit check for determining whether or not the passage condition has been satisfied may be performed by using a two-dimensional plane or a three-dimensional solid as the hit area HA. The hit check for determining whether or not the passage condition has been satisfied may be performed by using a hit box set for the player's character PC instead of the representative point RP of the player's character PC.

Figure 12B:
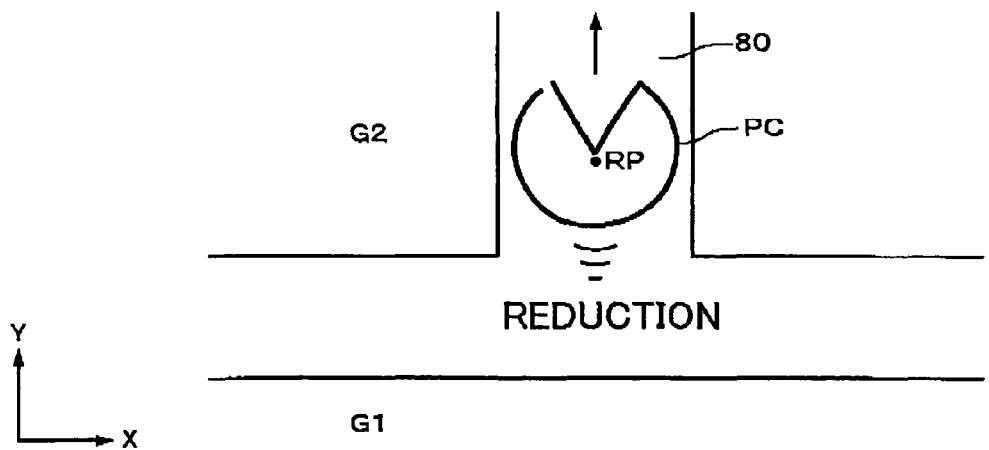

When the player's character PC passes through the path 80, the size or the shape of the player's character PC may be changed corresponding to the path 80. In FIG. 12B, the size of the player's character PC is reduced (or increased) according to the size of the path 80.

Specifically, in one embodiment of the invention, the player's character PC is generated by the player's touch input. Therefore, characters of various sizes are generated as the player's character PC. Therefore, when the player draws a large player's character PC, a situation may occur in which the player's character PC cannot pass through the path 80 or an image becomes unnatural. However, occurrence of such a situation can be prevented by performing the expansion-reduction processing as shown in FIG. 12B.

In FIG. 12B, the size of the player's character PC is changed. However, the shape of the player's character PC may be changed. For example, when the path 80 is a narrow path, the shape of the player's character PC may be changed into a narrow shape. When the player's character PC moves from the game field G1 to the game field G2, the motion or animation of the player's character PC may be changed.

It should be understood that various modifications and variations may be made as to the method of determining whether or not the passage condition has been satisfied and moving the player's character PC from the game field G1 to the game field G2 as shown in FIGS. 12A and 12B. For example, the player's character PC may be moved from the game field G1 to the game field G2 merely by determining whether or not the passage condition has been satisfied without determining whether or not the movement permission condition has been satisfied.

Figure 13:
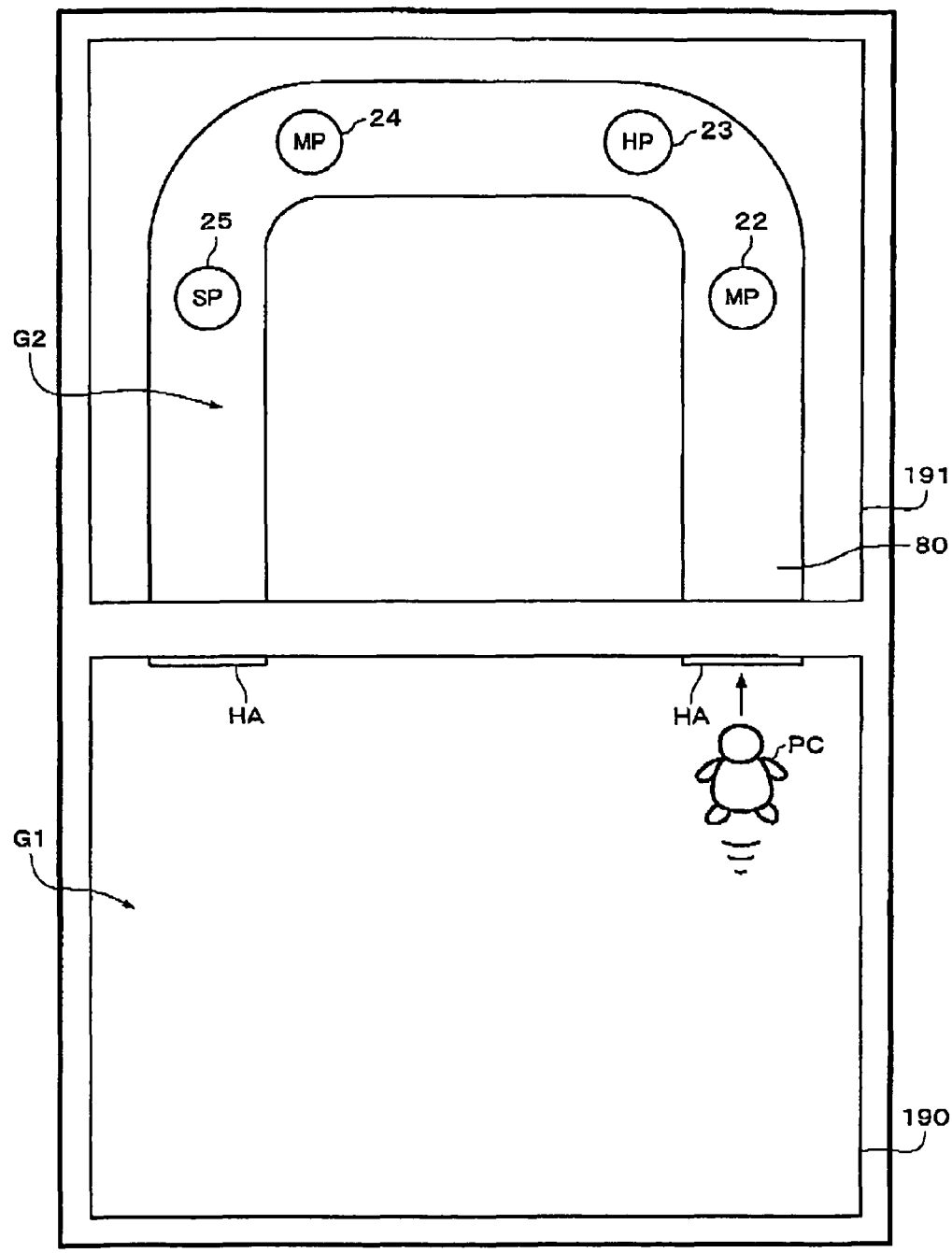
FIG. 13 is an example of a game image illustrative of a method according to one embodiment of the invention.
Figure 14:
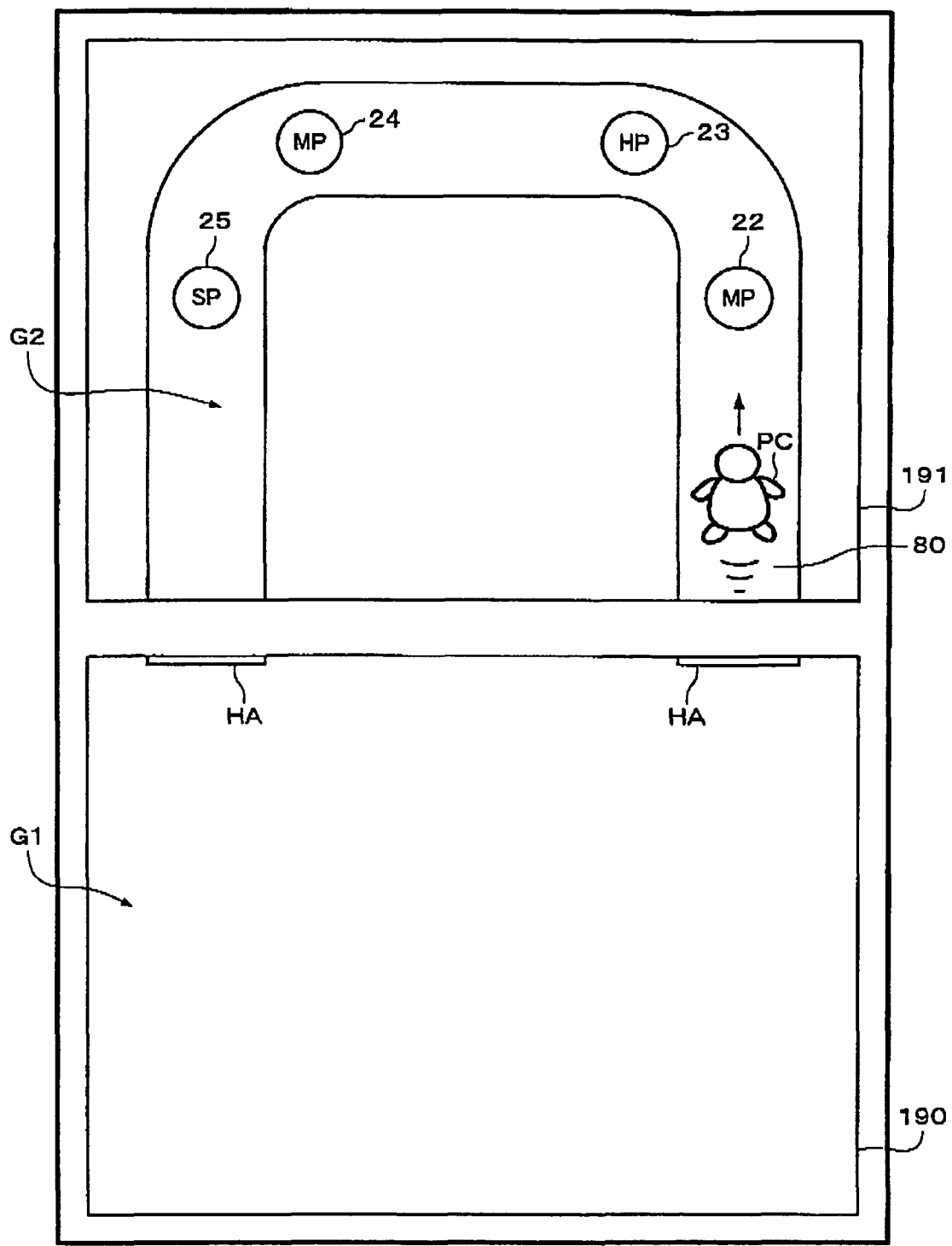
FIG. 14 is an example of a game image illustrative of a method according to one embodiment of the invention.

In FIG. 13, the player's character PC operated by the player moves in the game field G1. When the player's character PC hits the hit area HA so that the passage condition is satisfied, the player's character PC can move from the game field G1 to the game field G2, as shown in FIG. 14. The ability of the player's character PC is increased or the score is increased by causing the player's character PC to acquire items 22, 23, 24, and 25, for example. In FIGS. 13 and 14, the player's character PC is moved from the game field G1 to the game field G2 merely by determining whether or not the passage condition has been satisfied without determining whether or not the movement permission condition has been satisfied. In FIGS. 13 and 14, when the player's character PC passes through the path 80, the size or the shape of the player's character PC may be changed corresponding to the path 80 as described with reference to FIG. 12B.

3. Processing of Embodiment

Figure 15:
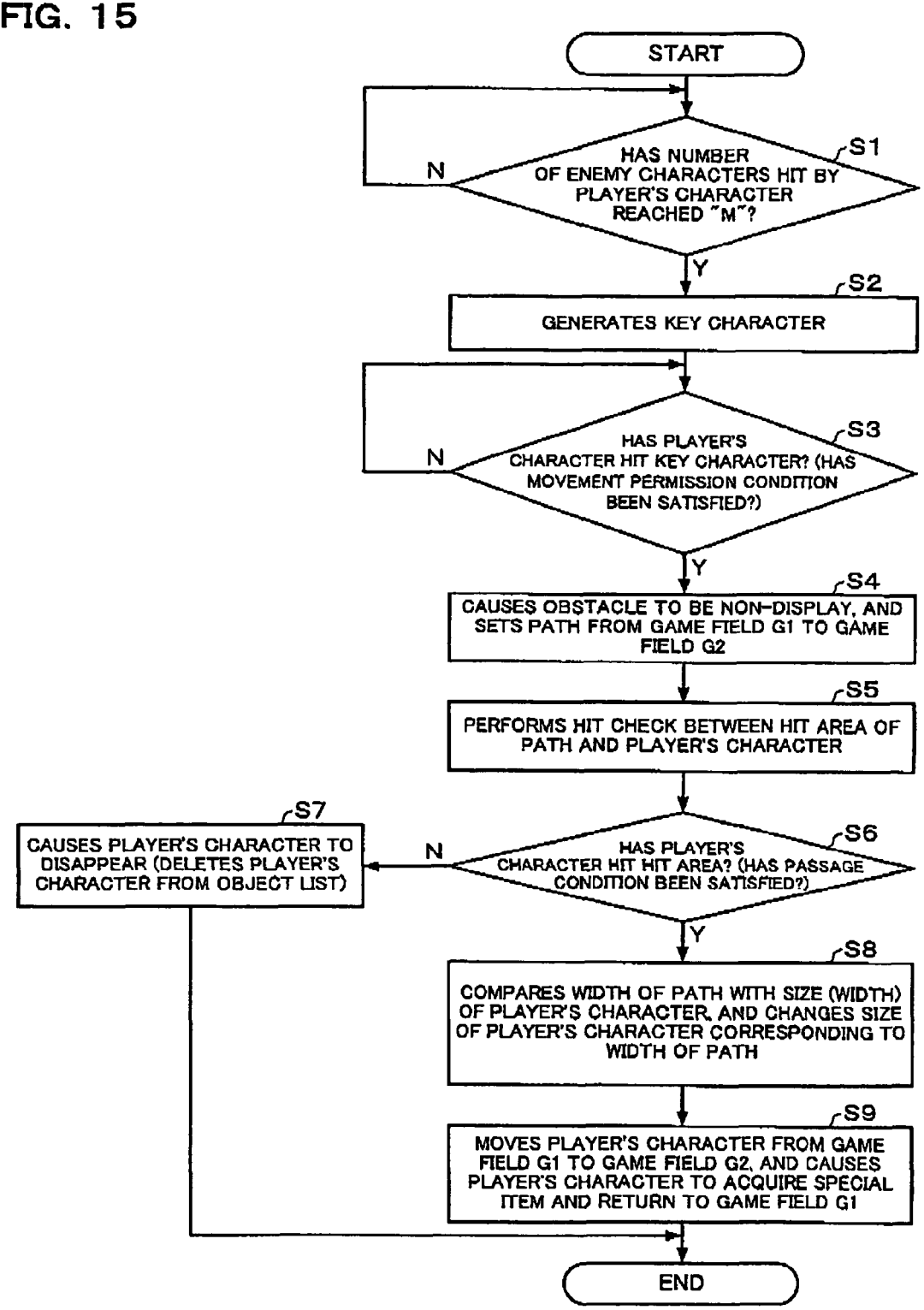
FIG. 15 is a flowchart of detailed processing according to one embodiment of the invention.

A detailed processing example according to one embodiment of the invention is described below with reference to flowcharts shown in FIGS. 15 and 16.

For example, whether or not the number of enemy characters hit by the player's character has reached "M" is determined (step S1). When the number of enemy characters hit by the player's character has reached "M", the key character is generated as described with reference to FIG. 6 (step S2). Specifically, the key character is registered in the object list.

Then, whether or not the player's character has hit the key character (whether or not the movement permission condition has been satisfied) is determined (step S3). When the player's character has hit the key character, the obstacle is caused to be non-display, and the path from the game field G1 to the game field G2 is set as described with reference to FIG. 7 (step S4).

A hit check between the hit area of the path and the player's character PC is then performed as described with reference to FIG. 12A (step S5). Whether or not the player's character has hit the hit area (whether or not the passage condition has been satisfied) is then determined (step S6). When the player's character has not hit the hit area, processing of causing the player's character to disappear is performed (step S7). Specifically, the player's character is deleted from the object list. When the player's character has hit the hit area, the width of the path and the size (width) of the player's character are compared, and the size of the player's character is changed (increased or decreased) according to the width of the path as described with reference to FIGS. 8 and 12B (step S8). The player's character PC is then moved from the game field G1 to the game field G2, caused to acquire the special item, and automatically returned to the game field G2 (step S9).

Figure 16:
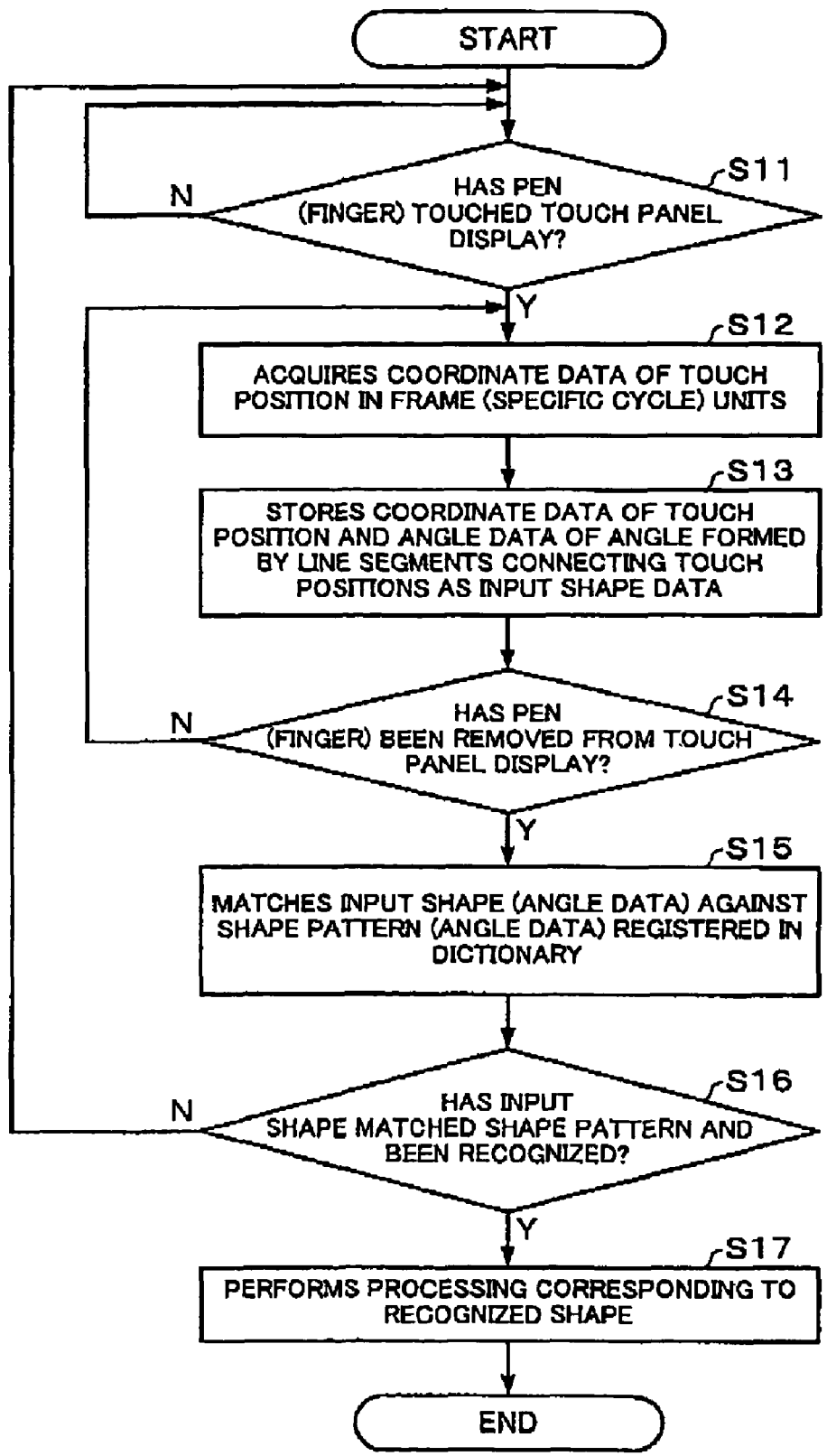
FIG. 16 is a flowchart of detailed processing according to one embodiment of the invention.

FIG. 16 is a flowchart showing input shape recognition processing. First, whether or not a pen (finger) has touched the touch panel display (whether or not pen-down has occurred) is determined (step S11). When the pen has touched the touch panel display, the coordinate data of the touch position is acquired in frame (specific cycle) units as described with reference to FIG. 4 (step S12). The coordinate data of the touch position and the angle data of the angle formed by the line segments connecting the touch positions are stored (saved) as input shape data (step S13).

Then, whether or not the pen (finger) has been removed from the touch panel display (whether or not pen-up has occurred) is determined (step S14). When the pen has been removed from the touch panel display, the input shape (angle data) is matched against the shape pattern (angle data) registered in the dictionary as described with reference to FIG. 5 (step S15). Then, whether or not the input shape has matched the shape pattern and the input shape has been recognized is determined (step S16). When the input shape has not been recognized, the processing returns to the step S11. When the input shape has been recognized, processing corresponding to the recognized shape is performed (step S17). For example, when the recognized shape is a linear shape, a hit check between the linear shape and the player's character is performed, and the player's character is moved in the direction corresponding to the direction of the linear shape. When the recognized shape is a character shape, a player's character corresponding to the input shape is generated and displayed.

The present invention is not limited to the above-described embodiments, and various modifications can be made within the scope of the invention. For example, any term (such as a touch panel display, display and player character) cited with a different term having broader or the same meaning (such as a first display, second display and moving object) at least once in this specification and drawings can be replaced by the different term in any place in this specification and drawings.

The processing of determining whether or not the movement permission condition has been satisfied, the processing of determining whether or not the passage condition has been satisfied, the processing of moving a moving object, and the processing of recognizing the input shape are not limited to those described in the above-described embodiments, and methods equivalent to these methods are also included within the scope of the invention. The invention may be applied to the case where three or more displays are provided.

The invention may be applied to various games other than the game described in the above-described embodiments. The invention may be applied to various image generation systems such as an arcade game device, a consumer game device, a portable game device, a large-scale attraction system in which a number of players participate, a simulator, a multimedia terminal, a system board which generates a game image, and a portable telephone.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A non-transitory computer-readable information storage medium storing a program for generating an image, the program causing a computer to function as:
    a display control section which controls display of game images displayed in first and second displays;
    a movement control section which controls movement of a moving object;
    a passage condition determination section which determines whether or not a passage condition for the moving object to pass through a path from a first game field to a second game field has been satisfied, the first game field being displayed in the first display and the second game field being displayed in the second display;
    an object change section which changes at least one of a size and a shape of the moving object according to the path when the moving object passes through the path; and
    a shape recognition section which performs processing of recognizing an input shape drawn by a player,
    wherein, when the input shape drawn by the player has been recognized to be a moving object shape, the display control section performs control of generating and displaying a moving object corresponding to the input shape drawn by the player, and
    wherein the movement control section performs control of moving the moving object from the first game field to the second game field when the passage condition has been satisfied.

2. The non-transitory computer-readable information storage medium as defined in claim 1,
    wherein the passage condition determination section performs a hit check between a passage determination hit area and the moving object, and determines that the passage condition has been satisfied when determining that the moving object has hit the hit area.

3. The non-transitory computer-readable information storage medium as defined in claim 1,
    the program causing the computer to function as:
        a game calculation section which performs processing of calculating a game parameter which changes as a result of game play using the moving object; and
        a movement permission condition determination section which determines, based on the game parameter which changes as a result of game play in a first game field, whether a movement permission condition for permitting movement of the moving object from the first game field to a second game field has been satisfied, the first game field being displayed in the first display and the second game field being displayed in the second display,
    wherein the movement control section performs control of moving the moving object from the first game field to the second game field when the movement permission condition has been satisfied.

4. The non-transitory computer-readable information storage medium as defined in claim 1,
    wherein the display control section performs control of causing an obstacle which has been displayed in the path to be non-display when the movement permission condition has been satisfied.

5. The non-transitory computer-readable information storage medium as defined in claim 1, the program causing the computer to function as:
    a counter section which counts down a time limit,
    wherein the movement control section performs control of moving the moving object from the first game field to the second game field when the movement permission condition has been satisfied within the time limit.

6. The non-transitory computer-readable information storage medium as defined in claim 1,
    wherein, when the moving object has moved from the first game field to the second game field, the game calculation section performs at least one of processing of causing the moving object to acquire an item, processing of changing a score or points, processing of changing status of the moving object, and processing of causing a player to play a game differing from the game in the first game field.

7. An image generation system which generates an image, the system comprising:
    a display control section which controls display of game images displayed in first and second displays;
    a movement control section which controls movement of a moving object;
    a passage condition determination section which determines whether or not a passage condition for the moving object to pass through a path from a first game field to a second game field has been satisfied, the first game field being displayed in the first display and the second game field being displayed in the second display;
    an object change section which changes at least one of a size and a shape of the moving object according to the path when the moving object passes through the path; and
    a shape recognition section which performs processing of recognizing an input shape drawn by a player, wherein, when the input shape drawn by the player has been recognized to be a moving object shape, the display control section performs control of generating and displaying a moving object corresponding to the input shape drawn by the player, and wherein the movement control section performs control of moving the moving object from the first game field to the second game field when the passage condition has been satisfied.

8. The image generation system as defined in claim 7, wherein the passage condition determination section performs a hit check between a passage determination hit area and the moving object, and determines that the passage condition has been satisfied when determining that the moving object has hit the hit area.

9. The image generation system as defined in claim 7, further comprising:
   a game calculation section which performs processing of calculating a game parameter which changes as a result of game play using the moving object; and
   a movement permission condition determination section which determines, based on the game parameter which changes as a result of game play in a first game field, whether a movement permission condition for permitting movement of the moving object from the first game field to a second game field has been satisfied, the first game field being displayed in the first display and the second game field being displayed in the second display, wherein the movement control section performs control of moving the moving object from the first game field to the second game field when the movement permission condition has been satisfied.

10. The image generation system as defined in claim 7, wherein the display control section performs control of causing an obstacle which has been displayed in the path to be non-display when the movement permission condition has been satisfied.

11. The image generation system as defined in claim 7, further comprising:
   a counter section which counts down a time limit,
   wherein the movement control section performs control of moving the moving object from the first game field to the second game field when the movement permission condition has been satisfied within the time limit.

12. The image generation system as defined in claim 7, wherein, when the moving object has moved from the first game field to the second game field, the game calculation section performs at least one of processing of causing the moving object to acquire an item, processing of changing a score or points, processing of changing status of the moving object, and processing of causing a player to play a game differing from the game in the first game field.

* * * * *